United States Patent [19]
Reinhardt et al.

[11] 3,940,252
[45] Feb. 24, 1976

[54] APPARATUS FOR THE RELEASING OF MATERIALS FROM VOLUMINOUS PRECIPITATES OR SUSPENSIONS

[75] Inventors: Helmut Reinhardt, Rodenkirchen; Karl Trebinger; Gottfried Kallrath, both of Wesseling, all of Germany

[73] Assignee: Deutsche Gold- und Silber-Scheideanstalt vormals Roessler, DT

[22] Filed: July 12, 1974

[21] Appl. No.: 488,152

Related U.S. Application Data

[62] Division of Ser. No. 343,170, March 20, 1973, Pat. No. 3,867,197.

[30] Foreign Application Priority Data
Mar. 27, 1972 Germany............................ 2214826

[52] U.S. Cl. ........ 23/270 R; 23/271 R; 23/270.5 T; 134/25 R; 210/21; 23/285
[51] Int. Cl.² ......................................... B01D 12/00
[58] Field of Search ....... 23/267 R, 270 R, 270.5 T, 23/271 R, 285; 134/25, 34; 210/21

[56] References Cited
UNITED STATES PATENTS

| | | |
|---|---|---|
| 1,114,018 | 10/1914 | Moore............................ 23/270 R |
| 2,551,820 | 5/1951 | Woody............................ 23/270 R |
| 2,663,623 | 12/1953 | Anderson........................ 23/270 R |
| 2,708,517 | 5/1955 | Evans............................. 23/270 R |
| 2,885,270 | 5/1959 | Korcher.......................... 23/270 R |
| 2,904,506 | 9/1959 | Penick............................ 23/270 R |
| 2,904,518 | 9/1959 | Shea............................... 23/270 R |
| 3,071,450 | 1/1963 | Martin............................ 23/270 R |
| 3,200,067 | 8/1965 | Levendusky..................... 23/270 R |
| 3,309,177 | 3/1967 | Goerg............................. 23/270 R |
| 3,593,536 | 7/1971 | LaFay............................. 23/270 R |

Primary Examiner—Jack Sofer
Assistant Examiner—S. J. Emery
Attorney, Agent, or Firm—Cushman, Darby & Cushman

[57] ABSTRACT

Voluminous precipitates or suspensions are contacted countercurrently with liquid purification or extraction agents that hold the continuously supplied precipitate or suspension in the upwardly flowing liquid in a kind of fluidized bed. A suitable apparatus is also described.

3 Claims, 1 Drawing Figure

U.S. Patent Feb. 24, 1976 3,940,252
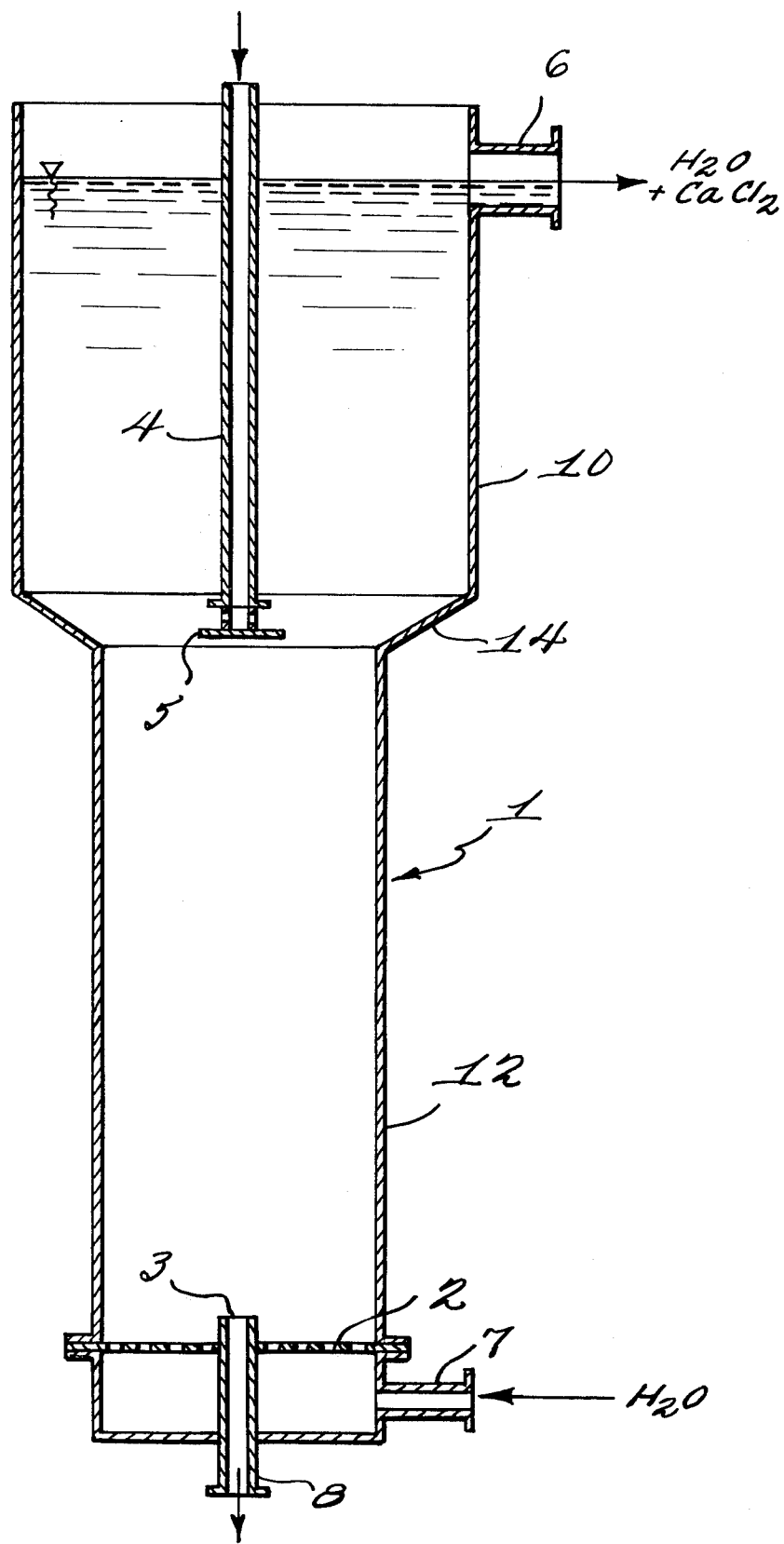

APPARATUS FOR THE RELEASING OF MATERIALS FROM VOLUMINOUS PRECIPITATES OR SUSPENSIONS

This is a division of application Ser. No. 343,170, filed Mar. 20, 1973, now U.S. Pat. No. 3,867,197.

It is known that voluminous precipitates such as, for example, hydroxides, are only freed with great difficulty from adhering soluble constituents. The working up of such products is carried out for the most part by frequent decanting and pressing off the precipitate in a filter press. It is possible to wash in a filter press. However this is mostly very time-consuming because of the poor filtration behavior of such precipitates. Also these processes, which are always run off discontinuously, are bound to be a considerable expense in personnel. There are needed large tanks which require much space. The preparation of the waste water often causes difficulties since the waste water accumulation takes place in batches in the decanting. This requires an over-sizing of the clarifying apparatus or the waste water drains off in poorly clarified condition. Precipitates of the above described types, for example, are the hydroxides or iron, zinc, aluminum, titanium, beryllium, chromium, as well as silica, silicates and other finely divided materials which are used as pigments.

In contrast it has now been found that voluminous precipitates or suspensions can be easily freed of the adhering dissolved materials if they are brought into countercurrent contact with liquid purification or extraction agents, that the constantly fed precipitate or suspension is held by the upwardly flowing liquid in a suspended condition in the manner of a fluidized bed, whereupon the dissolved material is withdrawn with the liquid agent over the top of the column and the precipitate or paste freed from adhering material is withdrawn from the bottom of the column as a suspension and is separately concentrated in known manner.

As washing agent there is preferably added water. However, there can also be used aqueous solutions of organic solvents if they satisfactorily dissolve the impurities. Thus there can be used lower molecular weight aliphatic alcohols and ketones such as methyl alcohol, ethyl alcohol, isopropyl alcohol, propyl alcohol, butyl alcohol, acetone and methyl ethyl ketone as well as ammonia, aliphatic amines, e.g. methyl amine, ethyl amine, propyl amine, diethylamine, ethyl propyl amine, trimethyl amine, aliphatic aminoalcohols, e.g. ethanolamine, diethanolamine, triethanolamine, propanolamine and low molecular weight aliphatic acids, e.g. formic acid, acetic acid, propionic acid and butyric acid. In general heterophilic organic compounds can be added.

Generally the process is carried out so that the liquid purification agent enters from below into the washing apparatus and the suspension to be washed arrives through a dip tube in the upper part of the apparatus.

The speeding of falling of the solid material must be greater than the upward flowing speed of the washing liquid, which amounts to a maximum of 90% of the dropping speed.

The process of the invention can be carried out in all apparatuses known for fluidized bed processes. The preferred apparatus, however, is a special apparatus of the invention described below.

The invention will be understood best in connection with the drawings wherein the single FIGURE is a schematic representation of a preferred apparatus.

Referring more specifically to the drawings, there is provided a cylindrical column 1 having a widened upper portion, preferably in the upper third, to form a tubular portion 10. The ratio of the cross section of the upper tubular portion 10 to the lower tubular portion 12 is preferably 1:2. The upper section 10 and the lower section 12 are joined by a short frustoconical section 14. Greater particle dispersion, however, can require a greater ratio or a smaller particle dispersion makes possible a smaller ratio of the cross sections. The increase in the cross section serves to lower the velocity of upward flow. The screen 2 effects an equal distribution of the washing liquid which enters via line 7. The distribution, however, can also take place with the help of a bubble plate or a tuyere plate. In the drain 3 there is located a measuring instrument, for example, an apparatus for measuring the electrical conductivity, with which the washing process can be controlled. The dip tube 4, for introduction of the precipitated or suspended product, is provided with spray diffuser apparatus 5, for example, a plate which provides for a uniform distribution of the suspension over the entire cross section of the lower part of the washing apparatus.

Through the product discharge 8 a diluted suspension is discharged which can be concentrated in known manner by decanting or centrifuging. In special cases, however, the solid material can be recovered as a dry powder (spray drying). It is also possible to subject the solid material in the form of the suspension to a subsequent reaction.

The process and apparatus are especially suited for washing so-called Berlin white and Berlin blue (Prussian blue) as well as other voluminous metal salts of ferro or ferricyanic acid, as well as for silicic acid and silicates, e.g. aluminum silicate, zinc silicate, calcium silicate and magnesium silicate.

Unless otherwise indicated all parts and percentages are by weight.

EXAMPLE 1

A washing apparatus according to the FIGURE and made of glass consisted of a tubular column having a lower portion 24 cm. long and 9 cm. in diameter and an upper portion 16 cm. long and 14 cm. in diameter. The two portions were connected by a frustoconical section. The bottom consisted of a glass frit GO through which the wash water was introduced. A few millimeters above the bottom there was located a drain for the washed suspension. The draining suspension was inspected for its contents of soluble material by means of an electrode which measured the electrical conductivity. The suspension to be washed was introduced through a dip tube which terminated in the frustoconical portion of the apparatus. A deflection plate was provided below the tube to uniformly distribute the solid material. The wash water discharged from a side pipe 6 in the upper wide portion of the apparatus.

An aqueous suspension of the so-called Berlin white, an iron (II) salt of ferrocyanic acid still contained dissolved calcium chloride from the production from calcium ferrocyanide and iron (II) chloride. The calcium chloride was to be removed. The finely divided precipitate was flocculated by addition of a non-ionic flocculating agent, specifically polyacrylamide, in order to increase the speed of sinking. The suspension was introduced through the dip tube into the wash water flowing upwardly from below. The Berlin white particles slowly sank against the counter flowing water and were discharged from the bottom pipe. Inside 1 hour 5.5 liters of a suspension having 70 grams/liter of Berlin white were passed through. The wash water needed amounted to 23 liters. The electrical conductivity of the draining suspension was at 2050 $\mu$S compared to 1780 $\mu$S of the wash water.

EXAMPLE 2

A semi-industrial apparatus of glass was built according to the principles given in example 1. The measurements were as follows:

lower portion diameter 200 mm., length 1,300 mm.
upper portion diameter 400 mm., length 400 mm.

The material washed was silica which was produced by precipitation from water glass and sulfuric acid. Within one hour 170 liters of a suspension having a solids contents of 29 grams/liter, were freed of the soluble constituents ($Na_2SO_4$). 340 liters of wash water were used for that purpose. The conductivity of the draining suspension amounted to 2,000 $\mu$S in comparison to 1,500 $\mu$S in the wash water added.

What we claimed is:

1. Apparatus for removing solvent soluble material from a voluminous suspension of solid material by countercurrent flow comprising a vertical column having a vertical cylindrical upper wide portion, a vertical cylindrical lower narrow portion, and a frustoconical portion interconnecting said upper and lower portions, the cross-sectional area of said upper portion being approximately twice that of the lower portion, first conduit means for introducing said suspension into said column extending from above and through said upper portion and terminating near the bottom of said frustoconical portion, dispersing means comprising a horizontal spray diffuser for providing a uniform distribution of the suspension over the entire cross-sectional area of said column lower portion, terminating said first conduit means at the beginning of said lower column portion, second conduit means disposed near the bottom of said column for introducing said solvent, means for evenly distributing said solvent introduced near said column bottom over the entire cross-sectional area of said column lower portion, said means including a horizontally disposed perforate member having a top portion thereof and located above said second conduit, means for discharging purified suspension from said column, said means including a single discharge conduit extending from slightly above the top of said horizontally disposed member through said member to below the second conduit, and means for removing solvent containing solubles released from the voluminous suspension, said means including a discharge device disposed in the top of said column upper portion and above the bottom termination of said first conduit means.

2. Apparatus as recited in claim 1 wherein said horizontally disposed member includes a screen.

3. Apparatus as recited in claim 1 further including means for measuring the conductivity of said solvent, said means disposed in said discharge device.

* * * * *